United States Patent
Lee et al.

(10) Patent No.: US 10,824,618 B2
(45) Date of Patent: Nov. 3, 2020

(54) SEPARATED APPLICATION SECURITY MANAGEMENT

(71) Applicant: Intel Corporation, Santa Clara, CA (US)

(72) Inventors: Guang-He Lee, Taipei (TW); Shao-Wen Yang, New Taipei (TW)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 15/758,072

(22) PCT Filed: Sep. 9, 2015

(86) PCT No.: PCT/US2015/049110
§ 371 (c)(1),
(2) Date: Mar. 7, 2018

(87) PCT Pub. No.: WO2017/044082
PCT Pub. Date: Mar. 16, 2017

(65) Prior Publication Data
US 2018/0246925 A1    Aug. 30, 2018

(51) Int. Cl.
*G06F 16/00* (2019.01)
*G06F 16/23* (2019.01)
*G06F 16/2455* (2019.01)
*G06F 16/215* (2019.01)
*G06F 17/10* (2006.01)

(52) U.S. Cl.
CPC ........ *G06F 16/2365* (2019.01); *G06F 16/215* (2019.01); *G06F 16/24568* (2019.01); *G06F 17/10* (2013.01)

(58) Field of Classification Search
CPC .................................................. G06F 16/2365
USPC .................................................. 707/691, 741
See application file for complete search history.

(56) References Cited

U.S. PATENT DOCUMENTS 10,116,573 B2 * 10/2018 Britt .................... H04L 47/2425
2007/0214133 A1    9/2007 Liberty et al.
2010/0189084 A1    7/2010 Chen et al.
(Continued)

FOREIGN PATENT DOCUMENTS

| CN | 104220979 A | 12/2014 |
| WO | 2012166671 A1 | 12/2012 |
| WO | 2017035536 A1 | 3/2017 |

OTHER PUBLICATIONS

"Efficient Energy Management and Data Recovery in Sensor Networks Using Latent Variables Based Tensor Factorization", By: Bojan Milosevic, Published 2013 http://delivery.acm.org/10.1145/2510000/2507953/p247-milosevic.pdf?ip=151.207.250.36&id=2507953&acc=ACTIVE%20SERVICE &key= C15944E53D0ACA63%2E4D4702B0C3E38B35%2E4D.*
(Continued)

*Primary Examiner* — Chelcie L Daye
(74) *Attorney, Agent, or Firm* — Alliance IP, LLC

(57) ABSTRACT

A set of data is identified that includes a plurality of observed values generated by a plurality of sensor devices located in a plurality of different locations. For each of the plurality of observed values, a modality of the value, a spatial location of the value, and a timestamp of the value is determined. Values for one or more missing values in the set of data are determined from the modalities, spatial locations, and timestamps of the plurality of observed values.

17 Claims, 9 Drawing Sheets

(56) References Cited

U.S. PATENT DOCUMENTS

| | | | | |
|---|---|---|---|---|
| 2010/0306290 | A1* | 12/2010 | Zhang | G06K 9/6232 |
| | | | | 708/205 |
| 2012/0197898 | A1* | 8/2012 | Pandey | G06F 16/2264 |
| | | | | 707/741 |
| 2014/0097966 | A1 | 4/2014 | Alexander | |
| 2017/0048308 | A1 | 2/2017 | Qaisar | |

OTHER PUBLICATIONS

"Efficient Energy Management and Data Recovery in Sensor Networks using Latent Variables Based Tensor Factorization"; By: Bojan Milosevic; Published 2013 https://dl.acm.org/doi/pdf/10.1145/2507924.2507953.*

Ashraf, Imran, et al; "Sleep mode techniques for small cell deployments", IEEE Communications Magazine, vol. 19, No. 8; Aug. 1, 2011; 8 pages.

Holger, Claussen, et al.; "Dynamic idle mode procedures for femtocells", Bell Labs Technical Journal, vol. 15, No. 2; Sep. 1, 2010; pp. 95-116.

Kim, Yoohwan, et al.; "New power saving algorithm considering associated STAs and consecutive traffics in WLAN AP", Proceedings of the 7th International Conference on Ubiquitous Information Management and Communication, Jan. 1, 2013; 5 pages.

Atsuhiro Narita et al., 'Tensor Factorization Using Auxiliary Information,' ECML PKDD 2011, Part II , LNAI vol. 6912, pp. 501-516, 2011.

Bojan Milosevic et al., "Efficient Energy Management and Data Recovery in Sensor Networks Using Latent Variables Based Tensor Factorizatio" In: Proceedings of the 16th ACM international conference on Modeling, analysis & simulition of wireless and mobile systems (MSWiM '13), Nov. 3-8, 2013, pp. 247-254.

International Preliminary Report on Patentability in International Application No. PCT/US2015/049110, dated Mar. 13, 2018, 8 pages.

International Search Report and Written Opinion in International Application No. PCT/US2015/049110, dated Jul. 11, 2016, 10 pages.

Morten Morup, 'Applications of tensor (multiway array) factorizations and decompositions in data mining,' Wiley Interdisciplinary Reviews: Data Mining and Knowledge Discovery, vol. 1, No. 1, pp. 24-40, Jan./Feb. 2011 See pp. 24, 30, 32, and 38.

Extended European Search Report issued for European Patent Application No. 18191352.6, dated Feb. 26, 2019; 14 pages.

Acar, Evrim, et al.; "Scalable Tensor Factorizations for Incomplete Data," arxiv.org, Cornell University Library; Ithaca, NY; May 12, 2010; 34 pages.

EPO; Office Action issued in EP Patent Application No. 15903719.1, dated Jan. 30, 2020; 9 pages.

SIPO; First Office Action issued in Chinese Patent Application No. CN 201580082301.6, dated Jun. 3, 2020; 18 pages including English translation.

* cited by examiner

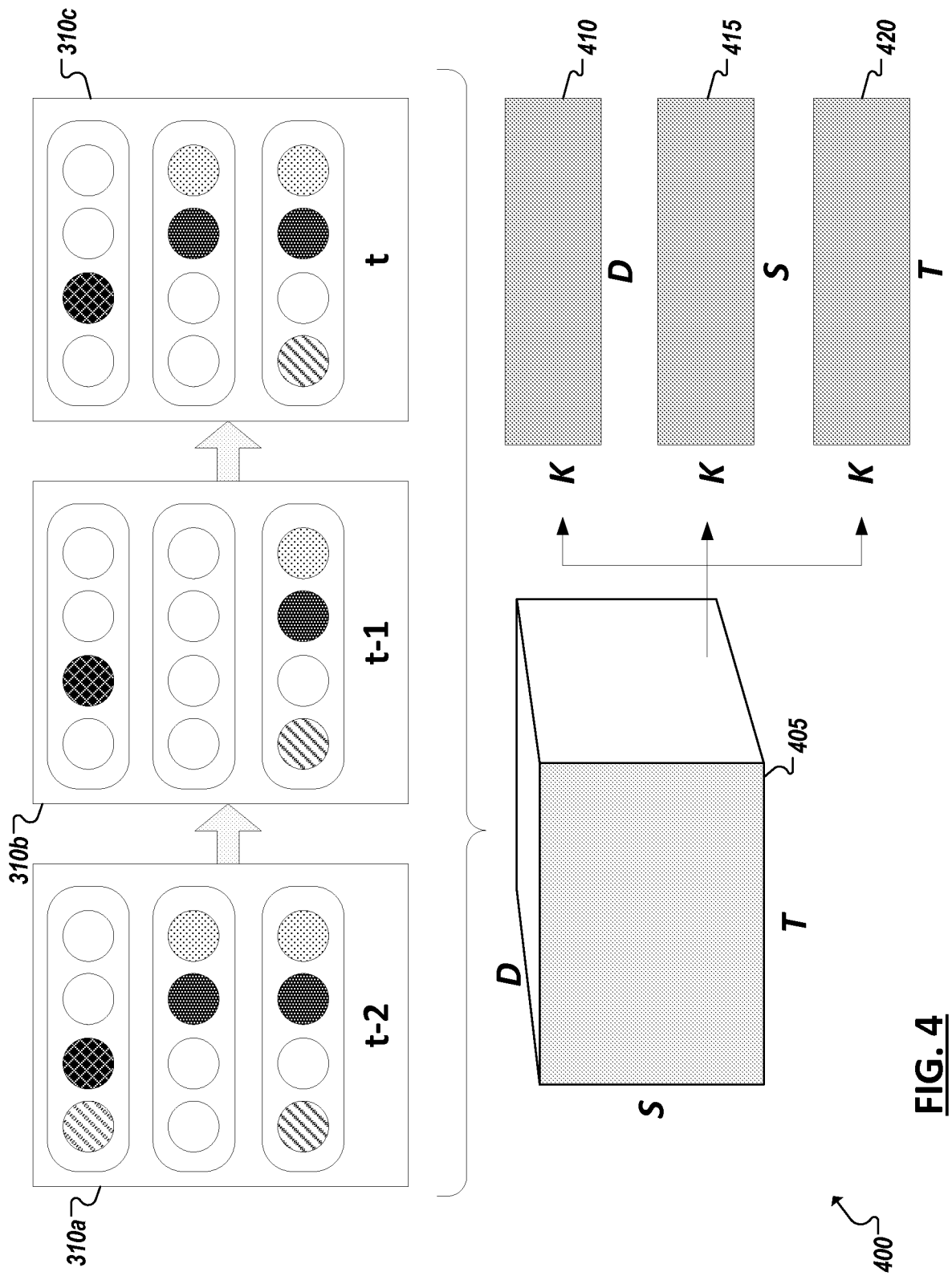

SEPARATED APPLICATION SECURITY MANAGEMENT

CROSS-REFERENCE TO RELATED APPLICATIONS

This application is a national stage application under 35 U.S.C. § 371 of PCT International Application Serial No. PCT/US2015/049110, filed on Sep. 9, 2015, and entitled SEPARATED APPLICATION SECURITY MANAGEMENT. The disclosure of the prior application is considered part of and is hereby incorporated by reference in its entirety in the disclosure of this application.

TECHNICAL FIELD

This disclosure relates in general to the field of computer systems and, more particularly, to data analytics.

BACKGROUND

The Internet has enabled interconnection of different computer networks all over the world. While previously, Internet-connectivity was limited to conventional general purpose computing systems, ever increasing numbers and types of products are being redesigned to accommodate connectivity with other devices over computer networks, including the Internet. For example, smart phones, tablet computers, wearables, and other mobile computing devices have become very popular, even supplanting larger, more traditional general purpose computing devices, such as traditional desktop computers in recent years. Increasingly, tasks traditionally performed on a general purpose computers are performed using mobile computing devices with smaller form factors and more constrained features sets and operating systems. Further, traditional appliances and devices are becoming "smarter" as they are ubiquitous and equipped with functionality to connect to or consume content from the Internet. For instance, devices, such as televisions, gaming systems, household appliances, thermostats, automobiles, watches, have been outfitted with network adapters to allow the devices to connect with the Internet (or another device) either directly or through a connection with another computer connected to the network. Additionally, this increasing universe of interconnected devices has also facilitated an increase in computer-controlled sensors that are likewise interconnected and collecting new and large sets of data. The interconnection of an increasingly large number of devices, or "things," is believed to foreshadow a new era of advanced automation and interconnectivity, referred to, sometimes, as the Internet of Things (IoT).

BRIEF DESCRIPTION OF THE DRAWINGS

FIG. 4 illustrates use of a tensor generated from an example data set.

Like reference numbers and designations in the various drawings indicate like elements.

DETAILED DESCRIPTION OF EXAMPLE EMBODIMENTS

Figure 1:
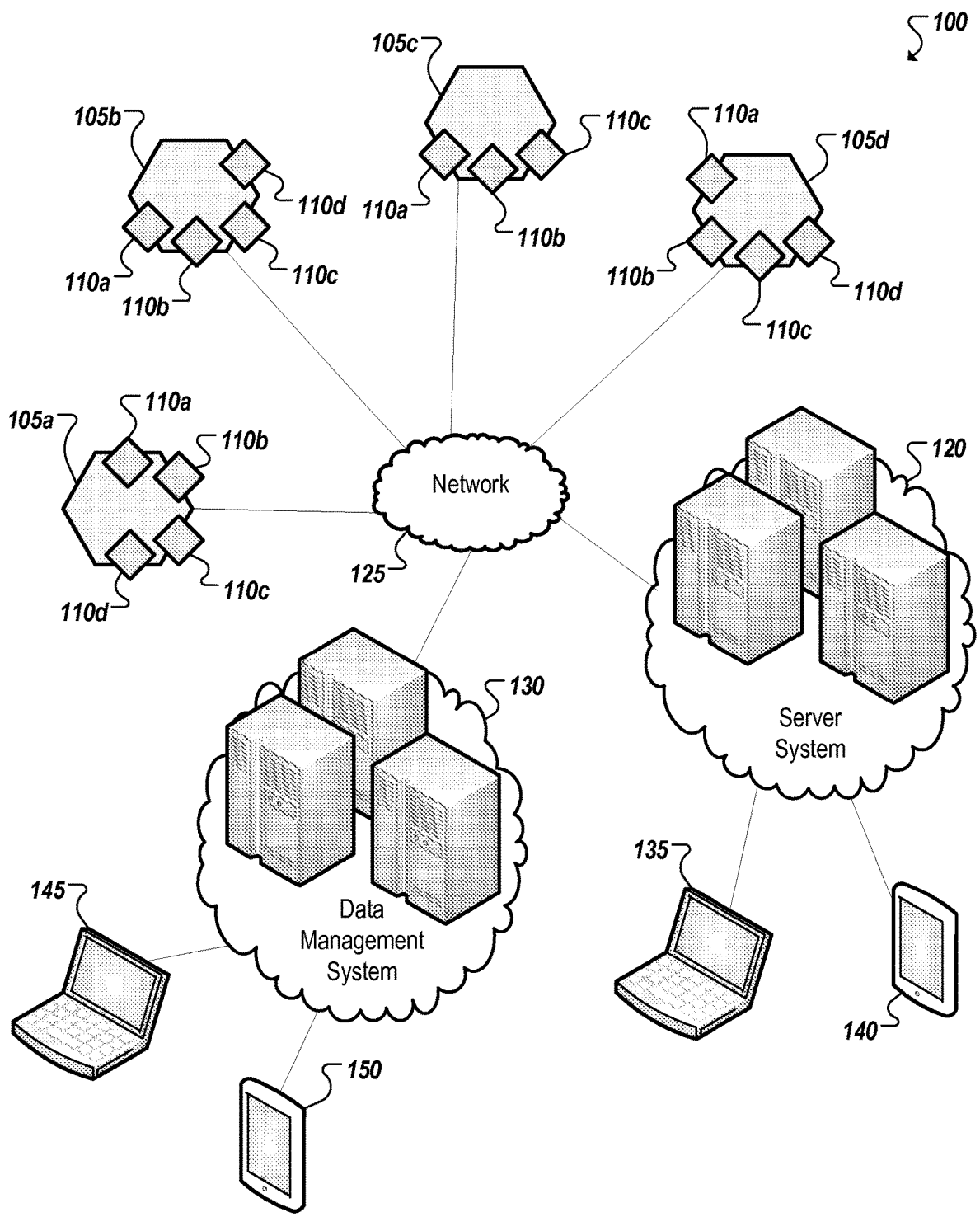
FIG. 1 illustrates an embodiment of a system including multiple sensor devices and an example data management system.

FIG. 1 is a block diagram illustrating a simplified representation of a system 100 that includes one or more sensors devices 105a-d deployed throughout an environment. Each device 105a-d may include one or more instances of various types of sensors (e.g., 110a-d). Sensors are capable of detecting, measuring, and generating sensor data describing characteristics of the environment. For instance, a given sensor (e.g., 110a) may be configured to detect such characteristics as movement, weight, physical contact, temperature, wind, noise, light, computer communications, wireless signals, humidity, the presence of radiation or specific chemical compounds, among several other examples. Indeed, sensors (e.g., 110a-d) as described herein, anticipate the development of a potentially limitless universe of various sensors, each designed to and capable of detecting, and generating corresponding sensor data for, new and known environmental characteristics.

In some implementations, sensor devices 105a-d and their composite sensors (e.g., 110a-d) can be incorporated in and/or embody an Internet of Things (IoT) system. IoT systems can refer to new or improved ad-hoc systems and networks composed of multiple different devices interoperating and synergizing to deliver one or more results or deliverables. Such ad-hoc systems are emerging as more and more products and equipment evolve to become "smart" in that they are controlled or monitored by computing processors and provided with facilities to communicate, through computer-implemented mechanisms, with other computing devices (and products having network communication capabilities). For instance, IoT systems can include networks built from sensors and communication modules integrated in or attached to "things" such as equipment, toys, tools, vehicles, etc. and even living things (e.g., plants, animals, humans, etc.). In some instances, an IoT system can develop organically or unexpectedly, with a collection of sensors monitoring a variety of things and related environments and interconnecting with data analytics systems and/or systems controlling one or more other smart devices to enable various use cases and application, including previously unknown use cases. As such, IoT systems can often be composed of a complex and diverse collection of connected systems, such as sourced or controlled by varied group of entities and employing varied hardware, operating systems, software applications, and technologies. Facilitating the successful interoperability of such diverse systems is, among other example considerations, an important issue when building or defining an IoT system.

As shown in the example of FIG. 1, multiple sensor devices (e.g., 105a-d) can be provided. A sensor device can be any apparatus that includes one or more sensors (e.g., 110a-d). For instance, a sensor device (e.g., 105a-d) can include such examples as a mobile personal computing device, such as a smart phone or tablet device, a wearable computing device (e.g., a smart watch, smart garment, smart glasses, smart helmet, headset, etc.), and less conventional computer-enhanced products such as smart appliances (e.g., smart televisions, smart refrigerators, etc.), home or building automation devices (e.g., smart heat-ventilation-air-conditioning (HVAC) controllers and sensors, light detection and controls, energy management tools, etc.), and other examples. Some sensor devices can be purpose-built to host sensors, such as a weather sensor device that includes multiple sensors related to weather monitoring (e.g., temperature, wind, humidity sensors, etc.). Some sensors may be statically located, such as a sensor device mounted within a building, on a lamppost or other exterior structure, secured to a floor (e.g., indoor or outdoor), and so on. Other sensors may monitor environmental characteristics of moving environments, such as a sensor provision in the interior or exterior of a vehicle, in-package sensors (e.g., for tracking cargo), wearable sensors worn by active human or animal users, among other examples. Still other sensors may be designed to move within an environment (e.g., autonomously or under the control of a user), such as a sensor device implemented as an aerial, ground-based, or underwater drone, among other examples.

Some sensor devices (e.g., 105a-d) in a collection of the sensor devices, may possess distinct instances of the same type of sensor (e.g., 110a-d). For instance, in the particular example illustrated in FIG. 1, each of the sensor devices 105a-d each include an instance of sensors 110a-c. While sensor devices 105a,b,d further include an instance of sensor 110d, sensor device 105c lacks such a sensor. Further, while one or more sensor devices 105a-d may share the ability (i.e., provided by a respective instance of a particular sensor) to collect the same type of information, the sensor devices' (e.g., 105a-d) respective instances of the common sensor (e.g., 110a-c) may differ, in that they are manufactured or calibrated by different entities, generate different data (e.g., different format, different unit measurements, different sensitivity, etc.), or possess different physical characteristics (e.g., age, wear, operating conditions), among other examples. Accordingly, even instances of the same sensor type (e.g., 110a) provided on multiple different sensor devices (e.g., 105a-d) may operate differently or inconsistently. For instance, a sensor of a particular type (e.g., 110a) provided on a first sensor device (e.g., 105a) may function more reliably than a different sensor of the same type (e.g., 110a) provided on another sensor device (e.g., 105b). As a result, sensor data for a corresponding environmental characteristic may be generated more consistently and frequently by the sensor on the first sensor device than by the same type of sensor on the second sensor device. Additionally, some sensors of a particular type provided by sensor devices (e.g., 105a-d) may generate data in different unit measurements despite representing a comparable semantic meaning or status. For instance, the data from a temperature sensor may be represented in any one of Celsius, Fahrenheit or Kelvin. Similarly, some sensor devices hosting one or more sensors may function more reliably than other sensor devices, resulting in some sensor devices providing a richer contribution of sensor data than others. Such inconsistencies can be considered inherent in some IoT systems given the diversity of the sensor devices and/or operating conditions involved. However, inconsistencies in the product of sensor data by the collection of sensor devices (e.g., 105a-d) within a system can lead to gaps, or "missing data," in the aggregate data set generated by the collection of sensor devices, among other example issues.

Continuing with the example of FIG. 1, in some implementations, one or more systems can control, monitor, and/or consumer sensor data generated by a collection of sensor devices (e.g., 105a-d). For instance, a server system (e.g., 120) can serve an application or service derived from the sensor data generated by a collection of sensor devices (e.g., 105a-d). The server system 120 can consume a data set generated by the collection of sensor devices to provide additional utility and insights through analysis of the data set. Such services might include (among potentially limitless alternative examples) air quality analysis based on multiple data points describing air quality characteristics, building security based on multiple data points relating to security, personal health based on multiple data points describing health characteristics of a single or group of human user(s), and so on. Sensor data, consumed by the server system 120, can be delivered to the server system 120 over one or more networks (e.g., 125). In other instances, prior to the sensor data being made available for consumption by one or more server systems (e.g., 120), sensor data, generated by a collection of sensor devices (e.g., 105a-d) can be aggregated and pre-processed by a data management system (e.g., 130). In some cases, a data management system 130 can be implemented separate from, and even independently of, server systems (e.g., 120) that are to use the data sets constructed by the data management system 130. In such cases, data sets (generated from aggregate sensor data) can be delivered or otherwise made accessible to one or more server systems (e.g., 120) over one or more networks (e.g., 125). In other implementations, the functionality of data management system 130 can be integrated with functionality of server system 120, allowing a single system to prepare, analyze, and host services from a collection of sensor data sourced from a set of sensor devices, among other examples.

An example data management system 130 can aggregate sensor data from the collection of sensor devices and perform maintenance tasks on the aggregate data to ready it for consumption by one or more services. For instance, a data management system 130 can process a data set to address the missing data issue introduced above. For example, a data management system 130 can include functionality for determining values for unobserved data points to fill-in holes within a data set developed from the aggregate sensor data. In some cases, missing data can compromise or undermine the utility of the entire data set and any services or applications consuming or otherwise dependent on the data set. In one example, data management system 130 can determine values for missing data based on tensor factorization using spatial coherence, temporal coherence and multi-modal coherence, among other example techniques.

One or more networks (e.g., 125) can facilitate communication between sensor devices (e.g., 105a-d) and systems (e.g., 120, 130) that manage and consume data of the sensor devices, including local networks, public networks, wide area networks, broadband cellular networks, the Internet, and the like. Additionally, computing environment 100 can include one or more user devices (e.g., 135, 140, 145, 150) that can allow users to access and interact with one or more of the applications, data, and/or services hosted by one or more systems (e.g., 120, 130) over a network 125, or at least partially local to the user devices (e.g., 145, 150), among other examples.

In general, "servers," "clients," "computing devices," "network elements," "hosts," "system-type system entities," "user devices," "sensor devices," and "systems" (e.g., 105a-d, 120, 130, 135, 140, 145, 150, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

The potential promise of IoT systems is based on the cooperation and interoperation of multiple different smart devices and sensors adding the ability to interconnect potentially limitless devices and computer-enhanced products and deliver heretofore unimagined innovations and solutions. IoT systems characteristically contain a significant number of diverse devices, many different architectures, diverse networks, and a variety of different use cases. Among the challenges for successful deployment of IoT are the static nature and unreliable operation of current IoT technologies in dynamic and challenging operating environments. Providing an IoT system of diverse devices that each perform with a common and consistent level of quality and reliability has been elusive and even cost prohibitive for many solutions. This spotty interoperation and system wide performance can result in missing data, as various IoT devices or their sensors intermittently or periodically fail to operate as designed. Such missing data can be problematic as other devices in the network of IoT system may be dependent on the missing data to generate their data leading to a chain of missing data across the system.

In an example implementation, a multi-modal approach is applied to the remediation of missing data in IoT systems using spatio-temporal coherence. Multi-modality can refer to the presence of multiple characteristics that are complementary, distinct or different from one another. For example, different sensors can measure several different and distinct types of characteristics and generate corresponding data describing diverse types of information. As an example, an IoT system can be deployed to address air quality measurements in an urban environment. Accordingly, a multitude of sensors can be placed through the environment, including sensors in unconventional areas, such as atop buildings, on lamp posts, on user-carried devices, on vehicles, etc. Further, different sensors can measure different characteristics, such as wind speed, air temperature, humidity, air pressure, light level, surface temperature, ozone level, and so on. Due to such issues as intermittent network connectivity, unreliable operations of sensors, software/hardware failure, power outages, regular maintenance to IOT devices, poor environmental conditions, and so on, missing data can result, and the missing data can span the different categories of data (i.e., it is not just contained to what type of data). Such missing data can jeopardize the utility of the system.

A system can be provided that incudes logic implemented in hardware and/or software to recover missing data by generating substitute data to fill in for the missing data using spatio-temporal coherence with multi-modality. Such substitute data can recover missing data for data sets missing substantial portions of the set (e.g., 80% or more missing) with high accuracy and without a requirement of prior knowledge (e.g., previously-determined trends or patterns from previously observed data), among other example advantages. For example, the system may use collaborative filtering to predict missing values with matrix or tensor factorization. Collaborative filtering can refer to processes of filtering for information using techniques involving collaboration among multiple viewpoints. In the present example, generalized tensor factorization can be used that takes into account each of spatial coherence, temporal coherence and multi-modality. A tensor can refer to a generalization of scalars, vectors, and matrices to an arbitrary number of indices. Tensor factorization takes, as input, an incomplete set of data, represents the incomplete set of data as an incomplete tensor, and learns a model to predict the unknown values within the incomplete tensor.

Figure 2:
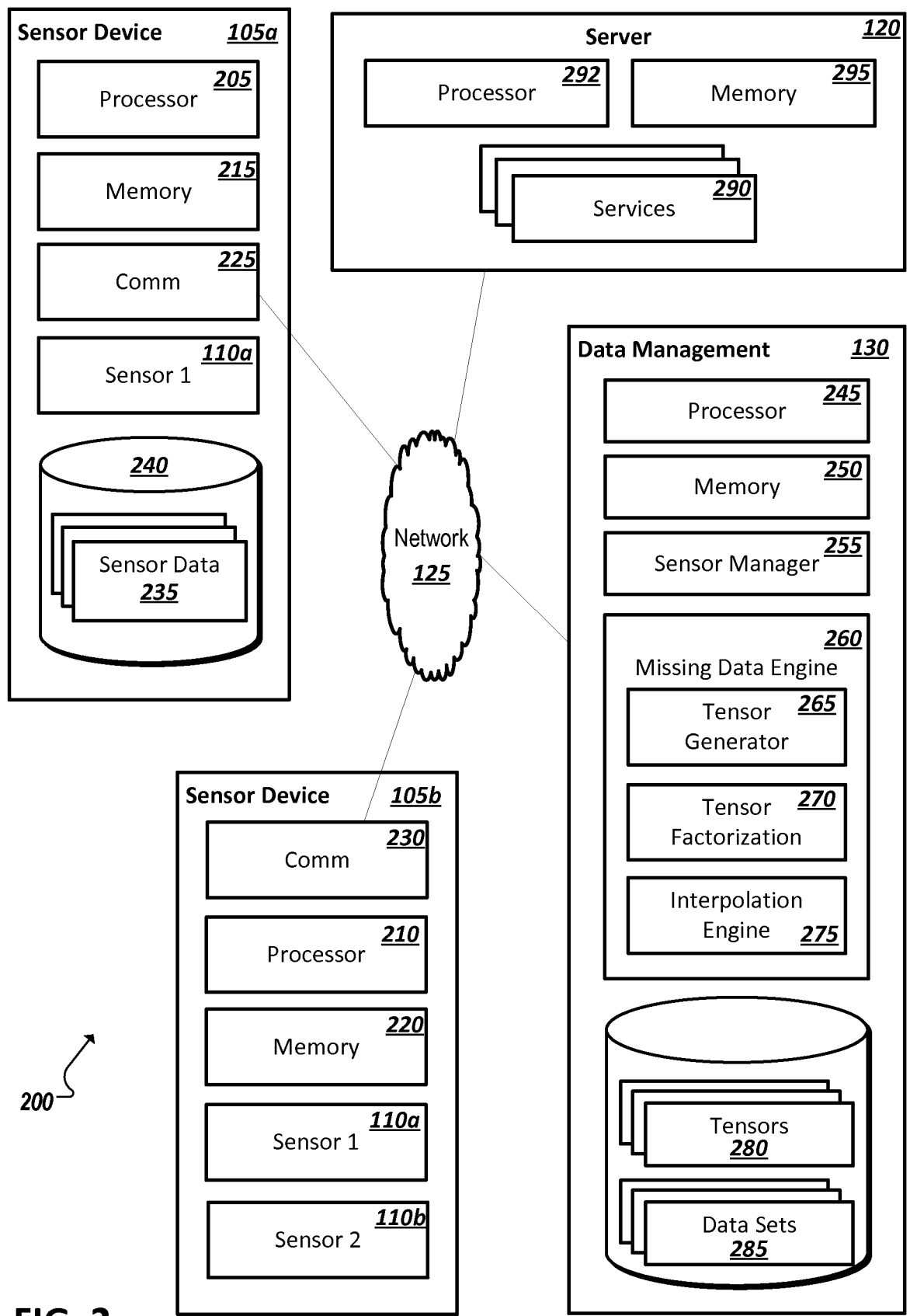
FIG. 2 illustrates an embodiment of a system including an example data management system configured to determine missing data values.

Turning to FIG. 2, a simplified block diagram 200 is shown illustrating a system including an example implementation of a data management engine 130 configured to determine missing values in a data set using tensor factorization. The system can include data management engine 130, a set of sensor devices (e.g., 105a-b), and server 120. The data set can be composed of sensor data (e.g., 235) generated by the collection of sensor devices (e.g., 105a-b). In one example, sensor devices 105a,b can include one or more processor devices 205, 210, one or more memory elements 215, 220, one or more sensors (e.g., 110a-b), and one or more additional components, implemented in hardware and/or software, such as a communications module 225, 230. The communications module 225, 230 can facilitate communication between the sensor device and one or more other devices. For instance, the communications modules 225, 230 can be used to interface with data management engine 130 or server 120 to make sensor data (e.g., 235) generated by the sensor device available to the interfacing system. In some cases, a sensor device (e.g., 105b) can generate sensor data and cause the data to be immediately communicated, or uploaded, to storage of another device or system (e.g., data management system (or "engine") 130), allowing data storage capabilities of the sensor device to be simplified. In other instances, a sensor device (e.g., 105a) can cache or store the sensor data (e.g., 235) it generates in a data store (e.g., 240). The sensor data 235 in such instances can be made available to other systems (e.g., 120, 130) by allowing access to the contents of the data store 240, with chunks of sensor data being reported or uploaded to the consuming systems (e.g., 120, 130). A communications module 225, 230 can facilitate additional communications, such as communications with user devices used, for instance, to administer, maintenance, or otherwise provide visibility into the sensor device. In other implementations, sensor devices (e.g., 105a-b) can communicate and interoperate with other sensor devices, and communications module 225, 230 can include functionality to permit communication between sensor devices. Communications modules 225, 230 can facilitate communication using one or more communications technologies, including wired and wireless communications, such as communications over WiFi, Ethernet, near field communications (NFC), Bluetooth, cellular broadband, and other networks (e.g., 125).

In the particular example of FIG. 2, a data management engine 130 can include one or more processor devices 245, one or more memory elements 250, and one or more components, implemented in hardware and/or software, such as a sensor manager 255 and missing data engine 260, among other examples. A sensor manager 255, in one example, can be configured to maintain records for identifying each of the sensor devices (e.g., 105a-b) within a system. The sensor manager 255 can interface with each of the sensor devices to obtain the respective sensor data generated by each sensor devices. As noted above, in some instances, sensor data can be delivered to the sensor manager 255 (e.g., over network 125) as it is generated. In other cases, the sensor manager 255 can query sensor devices to obtain sensor data generated and stored at the sensor devices, among other examples. A sensor manager 255 can aggregate and organize the sensor data obtained from a (potentially diverse) collection of the server devices (e.g., 105a-b). The sensor manager 255 can detect, maintain, or otherwise identify characteristics of each sensor device and can attribute these characteristics, such as sensor type, sensor model, sensor location, etc., to the sensor data generated by the corresponding sensor device. The sensor manager can also manage and control operations of a network of sensor devices to perform a particular sensing or monitoring session, among other examples.

In one example, a data management engine 130 can include a missing data engine 260 that can include sub-components used to determine values for missing data in the aggregate sensor data collected from sensor devices 105a-b. For instance, in one implementation, missing data engine 260 can include tensor generator 265, a tensor factorization engine 270, and interpolation logic 275, among other components implemented in hardware and/or software. Tensor generator 265 can be configured to process data sets 285 possessing missing data to determine one or more three-dimensional tensors 280 for the data set 285. A data set 285 can embody an aggregation of sensor data collected from multiple different sensor devices (e.g., 105a-b). Tensor factorization engine 270 can utilize a tensor 280 generated for a particular data set 285 to determine values for one or more missing data values in the particular data set 285. In some cases, tensor factorization can permit values for all missing data values in a particular data set to be determined. In such instances, the data set can be "completed" and made available for further processing (e.g., in connection with services 290 provided by a server 120). In other instances, tensor factorization can determine most but not all of the values for the missing data in a data set (e.g., from the corresponding tensor 280). In such instances, interpolation logic 275 can be used to determine further missing data values. Specifically, tensor factorization engine 270 can complete all missing values within the tensor representation. However, in some cases, values not comprehended within the tensor representation may be of interest (e.g., corresponding to geolocations without a particular deployed sensor type, instances of time without any observed sensor values, etc.). The interpolation logic 275 can operate on the partially completed data set 285 following tensor factorization learning. In other words, interpolation performed by interpolation engine 275 can be performed on the improved data set composed of both the originally-observed data values and the synthetically-generated missing data values (i.e., from tensor factorization). Interpolation can be used to address any missing data values remaining following tensor factorization to complete the data set 285 and make it ready for further processing.

A server system 120 can be provided to consume completed data sets 285 prepared by data management system 130. In one example, the server 120 can include one or more processor devices 292, one or more memory elements 295, and code to be executed to provide one or more software services or applications (collectively 290). The services 290 can perform data analytics on a data set 285 to generate one or more outcomes in connection with the service 290. In some cases, the service 290 can operate upon a data set 285 to derive results reporting conditions or events based on information in the data set 285. In some examples, a service 290 can further use these results to trigger an alert or other event. For instance, the service 290 can send a signal to a computing device based on an outcome determined from the completed data set 285 to cause the computing device to perform an action relating to the event. In some cases, the service 290 can cause additional functionality provided on or in connection with a particular sensor device to be perform a particular action in response to the event, among other examples.

In one example, to determine a tensor for a data set, spatial coherence, temporal coherence, and multi-modal coherence can each be determined. The tensor can represent the collaborative relationships between spatial coherence, temporal coherence, and multi-modal coherence. Coherence may and may not imply continuity. Data interpolation, on the other hand, can assume continuity while tensor factorization learns coherence, which may not be continuous in any sense. Spatial coherence can describes the correlation between data as measured at different points in physical space, either lateral or longitudinal. Temporal coherence can describe the correlation between data at various instances of time. Multi-modal coherence can describe the correlation between data collected from various heterogeneous sensors. The tensor can be generated from these coherences and can represent the broader data set, including unknown or missing values, with tensor factorization being used to predict the missing values.

Traditional techniques for determining missing data rely on data models based on one or more functions, f, each function being used to determine a respective value, y, from one or more respective variables, or features, x. In such models, the determination of the value y is dependent on x and the corresponding feature x must, therefore, be present for whichever data point (e.g., of y) we are to predict. In other words, features can be considered additional information that correlates with a particular set of data values. For example, in air quality inference, features may include population, temperature, weekday or weekend, humidity, climate, etc. upon which one or more other values are defined to depend. However, when a feature value is not available across space and time, values of other data dependent on the feature are not available. Consistent availability of features is not always comprehensive or available, resulting in errors when features are relied upon in interpolation of various data. Systems providing missing data tensor factorization based on spatio-temporal coherence with multi-modality can be performed without the use of features (although features can be used to supplement the power of the solution).

Coherence may not assume continuity in space and/or time, but instead learns collaboratively the coherence across space, time, and multimodal sensors automatically. Note that tensor representation does not assume continuity; namely, the results are the same even if, hyperplanes, e.g., planes in a 3D tensor, are shuffled beforehand.

While interpolation generally takes into account spatial continuity and temporal continuity, a data management engine may determine (or predict or infer) data values of multi-modality jointly and collaboratively using tensor factorization. As an example, in the case of a data set representing air quality samples, coarse dust particles (PM10) and fine particles (PM2.5) may or may not be correlated depending on spatial coherence, temporal coherence and other environmental factors. However, tensor factorization can learn their correlation, if any, without additional information or features (such as used by supervised learning techniques like support vector machines (SVMs) which mandate features), among other examples.

While FIG. 2 illustrated one example of a system including an example data management engine, it should be appreciated that the system shown in FIG. 2 is provided as a non-limiting example. Indeed, a variety of alternative implementations can likewise apply the general principles introduced in FIG. 2 (and elsewhere within the Specification). For instance, functionality of the server and data management engine can be combined. In some instances, the data management engine may include or be provided in connection with one of the sensor devices in a collection of sensor devices (e.g., with the sensor device having data management logic serving as the "master" of the collection). In some instances, functionality of one or both of the server and data management engine can be implemented at least in part by one or more of the sensor devices (and potentially also a remote centralized server system). Indeed, in one example, the data management engine can be implemented by pooling processing resources of a plurality of the sensor devices. In yet another alternative example, the varied components of a data management engine can be provided by multiple different systems hosted by multiple different host computers (e.g., rather than on a single device or system). Further, while the sensor devices represented in FIGS. 1-2 are shown with varied sensing capabilities, in some implementations, each of the sensor devices may each be equipped with matching sensing capabilities, among other alternative examples.

Figure 3:
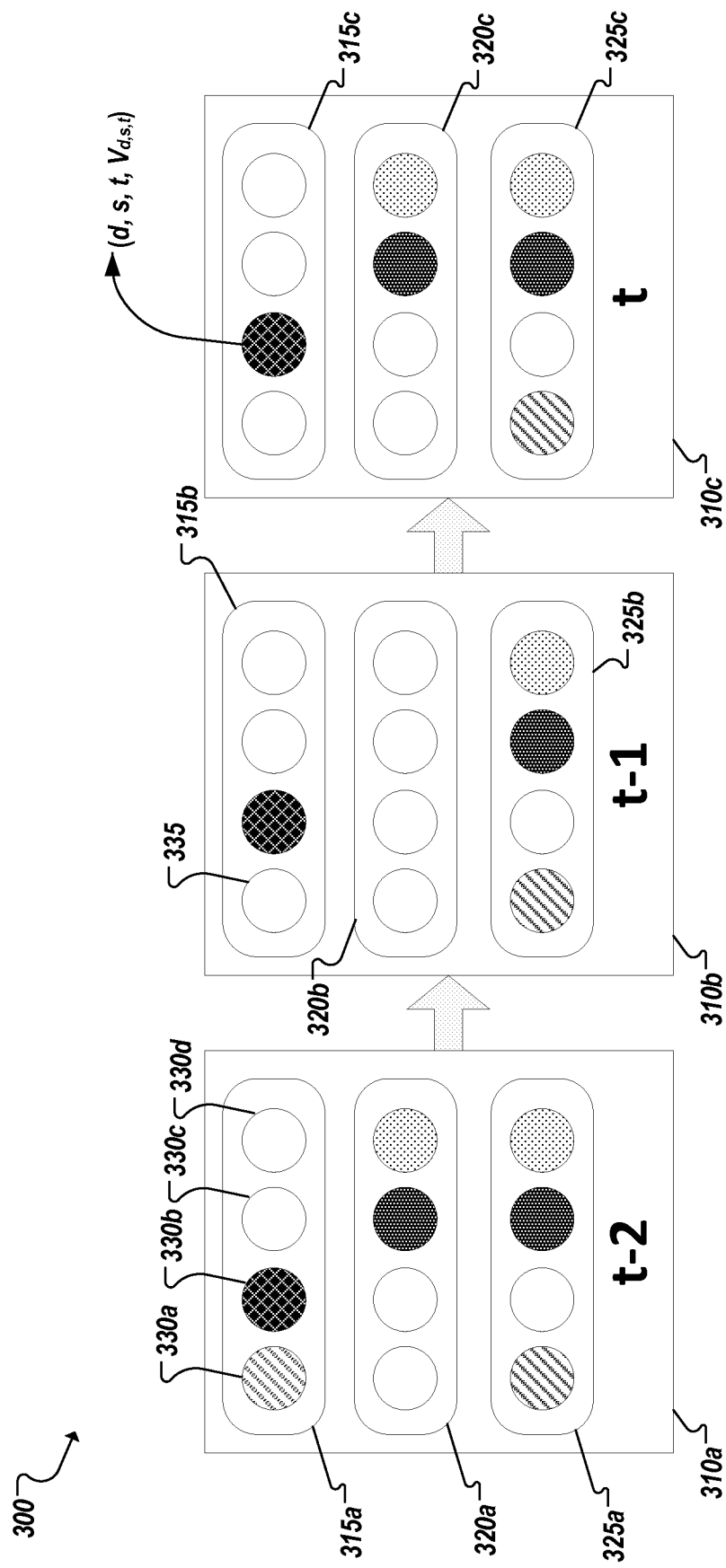
FIG. 3 illustrates a representation of missing data in a portion of an example data set.

Turning to FIG. 3, a simplified block diagram 300 is shown illustrating a representation of a data set generated by three sensor devices and including missing data. FIG. 3 represents portions 310a, 310b, 310c of a data set collected at three instances of time (i.e., t-2, t-1, and t). At each instance of time, three distinct sensor devices at three distinct physical locations (represented by groupings 315a-c, 320a-c, 325a-c) can attempt to provide data using four different sensors, or modalities (e.g., 330a-d). Accordingly, the block diagram 300 represents instances of missing data within a data set. For instance, element 330a is represented as filled to indicate that data was returned by a first sensor type located spatially at a first sensor device at time t-2. Likewise, as shown by element 330b, data was returned by a different second sensor located at the first sensor device at time t-2. However, data was missing from a third and fourth sensor (as shown in the empty elements 330c-d) at the first sensor device at time t-2. Further illustrated in FIG. 3, in one example, while data was successfully generated by a first sensor of a first sensor device at time t-2 (as shown by 330a), data for that same sensor was missing at time t-1 (as shown by 335). Indeed, as shown in element 320b, no sensor located at a second sensor device generated data at time t-1, while three out of four sensors (e.g., sensors of the first, third, and fourth types) of the third sensor device generate data at time t-1. A sensor device may fail to generate data for a particular modality at a particular instance of time for a variety reasons, including malfunction of the sensor, malfunction of the sensor device (e.g., a communication or processing malfunction), power loss, etc. In some instances, a sensor device may simply lack a sensor for a particular modality. As an example, in FIG. 3, data generated by a second sensor device (represented by 320a-c) may never include data of the first and second sensor types. In some examples, this may be due to the second sensor device not having sensors of the first and second types, among other potential causes.

As illustrated in FIG. 3, each data value can have at least three characteristics: a spatial location (discernable from the location of the sensor device hosting the sensor responsible for generating the data value), a time stamp, and a modality (e.g., the type of sensor, or how the data was obtained). Accordingly, device location, sensor type, and time stamp can be denoted as d, s, t, respectively, with $V_{d,s,t}$ referring to the value for a data point at (d, s, t). Thus the value of each data point can be represented by (d, s, t, $V_{d,s,t}$), as shown in FIG. 3. For missing data, the corresponding value $V_{d,s,t}$ will be empty.

In one example, values of missing data (e.g., illustrated in FIG. 3) can be inferred by normalization parameters of each sensor and learning latent factors to model the latent information of each device (or spatial location) (d), sensor (or modality) (s), timestamp (t) data point using tensor factorization. Any missing data remaining from spatial or temporal gaps in the data set, not addressable through tensor factorization can then be addressed using interpolation based on prediction values to compensate sparsity of training data. Interpolation can be used, for instance, to infer missing data at locations or instances of time where no data (of any modality) is collected.

A multi-modal data set can be pre-processed through normalization to address variations in the value ranges of different types of data generated by the different sensors. In one example, normalization can be formulated according to:

$$V'_{d,s,t} = \frac{V_{d,s,t} - \mu_s}{\sigma_s} \quad (1)$$

Where $\mu_s$ denotes the mean and $\sigma_s$ denotes the standard deviation of all observed values with a sensor type, or modality, s. In some cases, normalization can be optional.

Proceeding with the determination of missing data values in a data set, latent factors can be constructed and learned. Turning to FIG. 4, a simplified block diagram 400 is shown representing high level concepts of missing data tensor factorization. Raw data (e.g., from 310a-c) can be transformed into a tensor V (405) according to the three dimensions of device location (spatiality) D, sensor type (modality) S, and timestamp T. Thus the tensor V (405) can have dimension d×s×t and include the missing values from the raw data. Tensor factorization can be used to decompose V into a set of low rank matrices (e.g., 410, 415, 420) D, S, T, so that:

$$V_{d,s,t} = D_d \cdot S_s \cdot T_t, \text{where } D \in R^{dk}, S \in R^{sk}, T \in R^{tk}$$

Tensor factorization can address multi-modal missing data by generating highly accurate predictive values for at least a portion of the missing data. A tensor V with missing data can be decomposed into latent factors D, S, T.

In the absence of a feature for each data point (d, s, t), standard supervised machine learning techniques fail to learn a feature-to-value mapping. Tensor factorization, however, can be used to model data and infer its low rank hidden structure, or latent factors. Assuming there are latent factors for all device locations, sensor types and at all timestamps, the missing data can be modeled by learning latent factors from the (present) observed data. As a result, these latent factors can be utilized to make prediction and further optimizations. Given arbitrary latent factors of dimension k for each device location, sensor type and timestamp, predictions for a (missing) data point (d, s, t) can be determined according to the following formula:

$$\overline{V}_{d,s,t} = \Sigma_k D_{d,k} * S_{s,k} * T_{t,k} \quad (2)$$

Equations (1) and (2) can be used in combination to derive an objective function with latent factors. In some cases, using the mean-squared error between Equation (1) and (2) can be used to develop optimized training data, however, this approach can potentially over-fit the training data and yield suboptimal generalization results. Accordingly, in some implementations, a regularization term can be further applied to the objective function and applied to the latent factors, D, S, and T, to regularize the complexity of the model. For instance, an L2 regularization term, i.e. the Frobenius norm of latent factors, can be adopted to ensure differentiability through the objective function. As an example, regularization can be combined with normalization (e.g., Equation (1)) to yield:

$$\Sigma_{observed(d,s,t)} (\overline{V}_{d,s,t} - V'_{d,s,t})^2 + \lambda (\|D\|_2^2 + \|S\|_2^2 \|T\|_2^2) \quad (3)$$

In Equation (3), λ is a value selected to represent a tradeoff between minimizing prediction error and complexity control.

To optimize Equation (3), stochastic gradient descent (SGD) can be used. For instance, an observed data point can be selected at random and can be optimized using the gradient of the objective function (3). For instance, an SGD training algorithm for latent factors can be embodied by as:
INPUT: a set of data points (d, s, t) with their value $V_{d,s,t}$, iteration N, latent dimension K, and learning rate α
OUTPUT: trained latent factors

---

Randomly initialize D, S, T with dimension (# of devices, K), (# of sensors, K), (# of timestamps, K)
For i in 1:N {
    For (d, s, t) in data set {
        $\Sigma_{error} = D_{d,k} * S_{s,k} * T_{t,k} - V'_{d,s,t}$
        For k in 1:K {
            $D_{d,k}$ -= α(error * $S_{s,k}$ * $T_{t,k}$ + λ$D_{d,k}$)
            $S_{s,k}$ -= α(error * $D_{d,k}$ * $T_{t,k}$ + λ$S_{s,k}$)
            $T_{t,k}$ -= α(error * $S_{s,k}$ * $D_{d,k}$ + λ$T_{t,k}$)
        }
    }
}
Return D, S, T

---

Resulting latent factors, D, S, T, can be regarded as a factorization of the original, observed dataset. For instance, as represented in FIG. 4, given that the original dataset is formulated as a mode-3 tensor 405, the sensor data can be factorized into three disjoint low-rank representations (e.g., 410, 415, 420), for instance, using PARAFAC factorization or another tensor decomposition technique. In some cases, the low-rank property can also suggest better generalization to unknown data from limited search space for optimizing the model, among other examples.

Figure 5B:
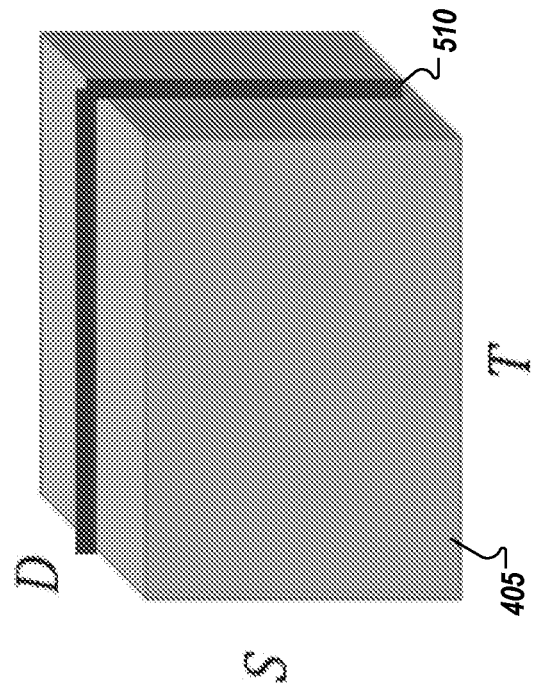
FIGS. 5A-5B illustrates representations of empty planes in a tensor.
Figure 5A:
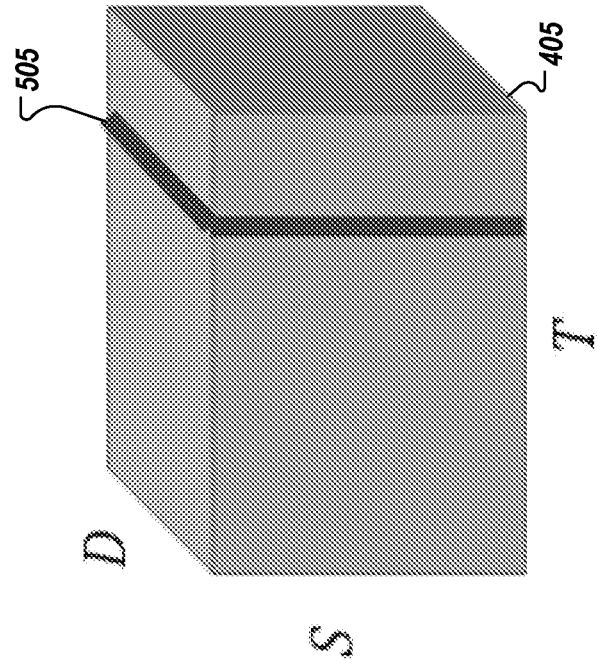

Through tensor factorization, missing data entries within the tensor can be recovered. However, in some cases, missing data values may lie outside the tensor in a multi-modal data set. For instance, if there are no values at all for a particular "plane" in the tensor, the corresponding latent factors do not exist (and effectively, neither does this plane within the tensor). In one example, illustrated in FIGS. 5A-5B, planes of missing data in a tensor 405 can exist when there are no sensor readings at all devices at a particular time stamp, such as represented by plane 505 illustrated in FIG. 5A. Additionally, planes of missing data in tensor 405 can result when there are no sensor readings at any time at a particular device location, as represented by the plane 510 illustrated in FIG. 5B. Planes of missing data can be identified (before or after generation of the tensor 405) to trigger an interpolation step on the result of the tensor factorization. Bridging a spatial gap (e.g., plane 505) can be accomplished through interpolation to approximate the values for an unobserved device d' as follows:

$$\hat{v}_{d',s,t} = \frac{\Sigma_{d!=d'} \frac{\overline{v}}{\text{distance}(d, d')}}{\Sigma_{d!=d'} \frac{1}{\text{distance}(d, d')}}$$

To bridge a gap in time, d' can be generalized, for instance, by learning an objective function that minimizes the Euclidean distance between nearby time latent factors, among other example implementations.

Figure 6:
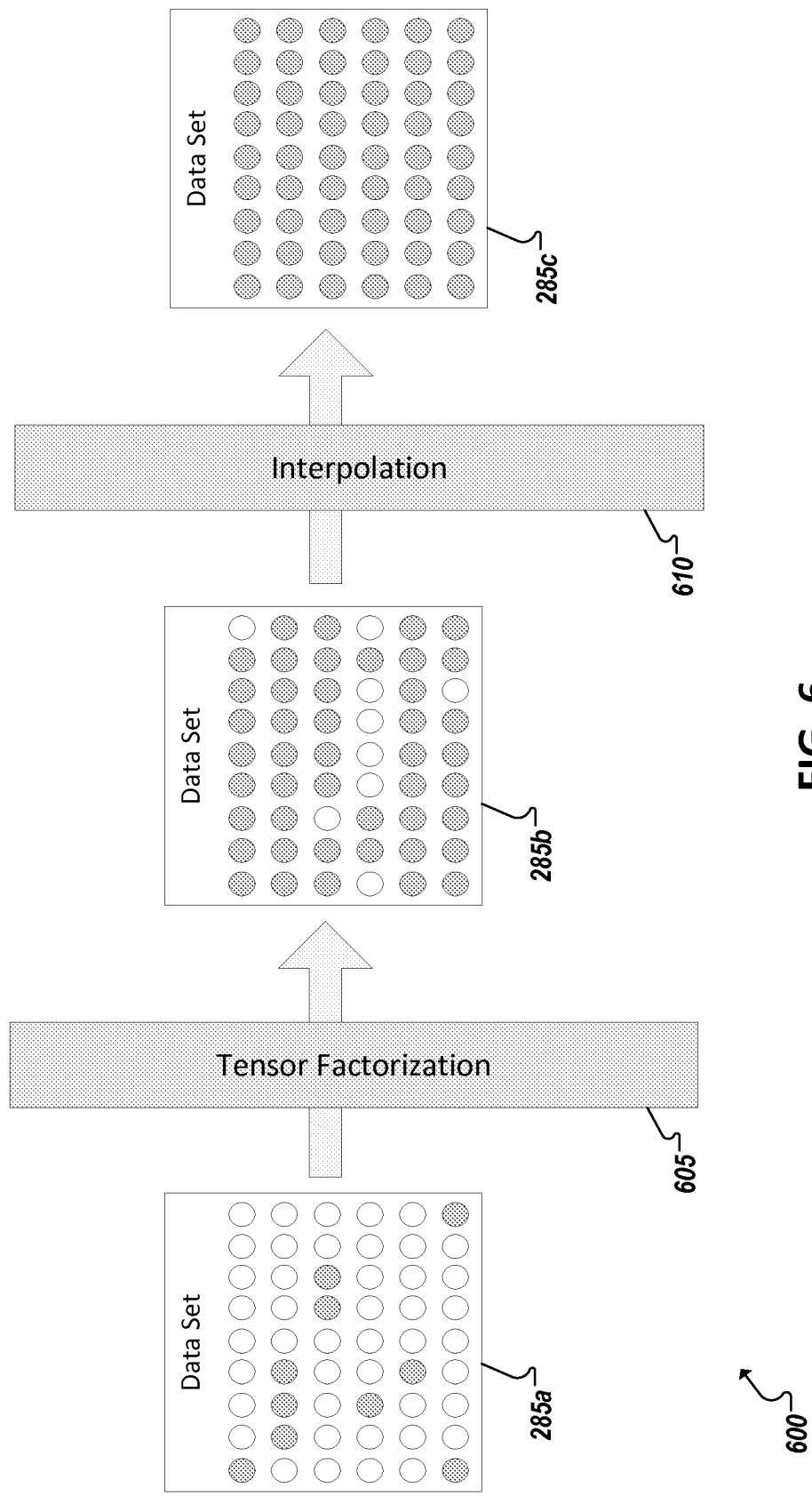
FIG. 6 illustrates remediation of missing data in an example data set.

Turning to FIG. 6, a simplified block diagram 600 is shown illustrating the development of a multi-modal data set composed of sensor data collected from a plurality of sensors on a plurality of sensor devices. The initial, or original, data set 285a can be composed of observed data values as generated by the sensor devices (as represented by the filled circles). A relatively large subset of the data points in the original data set 285a can be missing (as represented by the unfilled circles). A tensor can be developed based on the original data set and serve as the basis of tensor factorization 605. Tensor factorization 605 can be according to the principles described above. From the tensor factorization, values for some or all of the originally missing data points can be determined, or predicted. For instance, the results of the tensor factorization 605 are reflected in the updated representation of the data set 285b, showing fewer "empty" data point values. In cases where the tensor factorization succeeds in determining values for each of the missing data points, the data set can be considered completed and made available for further processing and analysis. This may result when no empty "planes" are present in the tensor. When empty data point values remain following the tensor factorization 605 (as in the example shown in FIG. 6) an additional interpolation process 610 can be performed on the updated data set 285b (i.e., that includes the results of the tensor factorization 605) to predict values for any remaining missing data points and produce completed data set 285c.

By way of illustration, the example tensor factorization procedure described herein can be compared, in experiments, to other conventional missing data solutions, such as Inversed Distance Weighting (IDW), k nearest neighbors (kNN), and STCDG. IDW is an interpolation method that produces the output based on the inversed distance weighting interpolation on observed training data. kNN is an interpolation method that produce the output based on interpolation of geographically k nearest neighbors on observed training data. STCDG is a state-of-the-art sensor missing value completion method based on matrix factorization (but does not regard multimodality coherence).

In a first example experiment, missing sensor values at known device locations are attempted to be determined using tensor factorization (TF) and IDW, kNN, and STCDG. In this example, 2% of the source data is sampled as testing data. For remaining data, 20%, 15%, 10%, 5% and 1% of the data is sampled to see the various techniques' respective reconstruction error on testing data. The results of this example experiment are shown is Table 1. From the data in Table 1, it is apparent that tensor factorization outperforms the other state-of-the-art methods (e.g., IDW, kNN, and STCDG) by a large margin. Specifically, with 20% of the data, tensor factorization can represent an over 100% improvement over the state of the art.

TABLE 1

Example Results in Experiment for Randomly Dropping a Data Point

| MSE | Data Ratio | | | | |
|---|---|---|---|---|---|
| Method | 20% | 15% | 10% | 5% | 1% |
| TF | 0.353741 | 0.428985 | 0.482286 | 0.60971 | 0.694102 |
| IDW | 1.076972 | 1.130481 | 1.217497 | 1.259752 | 1.112561 |
| kNN | 1.033363 | 1.082938 | 1.180165 | 1.235166 | 1.110692 |
| STCDG | 0.767967 | 0.771044 | 0.77184 | 0.777897 | 0.782217 |

In a second example experiment, the ability of each solution to predict missing values for unknown device is tested. In this example, no information is unavailable except for coordinates for unknown devices. In such instance, data from nearby devices is used to infer sensor values of the unknown devices. In this experiment, sensor devices are removed (e.g., from a set of fifteen (15) devices), one at a time, for validation, with the remaining sensor devices' values being used to predict the values of the missing sensor(s). Table 2 reflects example results from this experiment (on the basis of mean squared error (MSE)), again showing the superiority of the tensor factorization approach over other solutions in the test.

TABLE 2

Example Results in Experiment for Randomly Dropping Sensor Devices

| MSE | TF | IDW | STCDG | KNN |
|---|---|---|---|---|
| 0 | 2.558412 | 3.164335 | 1.608033 | 2.922554 |
| 1 | 0.450936 | 0.604042 | 0.949003 | 0.662563 |
| 2 | 1.188361 | 1.765572 | 1.133904 | 1.521043 |
| 3 | 0.460683 | 0.887955 | 2.120433 | 0.71683 |
| 4 | 0.299857 | 0.471364 | 1.667552 | 0.510785 |
| 5 | 0.59569 | 1.038219 | 0.590431 | 1.027829 |
| 6 | 0.771496 | 0.951923 | 1.689094 | 0.938355 |
| 7 | 0.523835 | 0.478713 | 2.862254 | 0.64764 |
| 8 | 0.369241 | 0.466423 | 2.014803 | 0.386993 |
| 9 | 1.84429 | 1.870454 | 3.326816 | 1.786087 |
| 10 | 0.467319 | 0.456529 | 2.179711 | 0.548024 |
| 11 | 0.574068 | 0.379841 | 3.395992 | 0.419458 |
| 12 | 1.538857 | 1.901025 | 1.461916 | 1.827771 |
| 13 | 0.69618 | 1.280865 | 2.134489 | 0.885716 |
| 14 | 1.704613 | 1.786256 | 3.231082 | 1.779723 |
| Average | 0.936256 | 1.166901 | 2.024368 | 1.105425 |

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Figure 7:
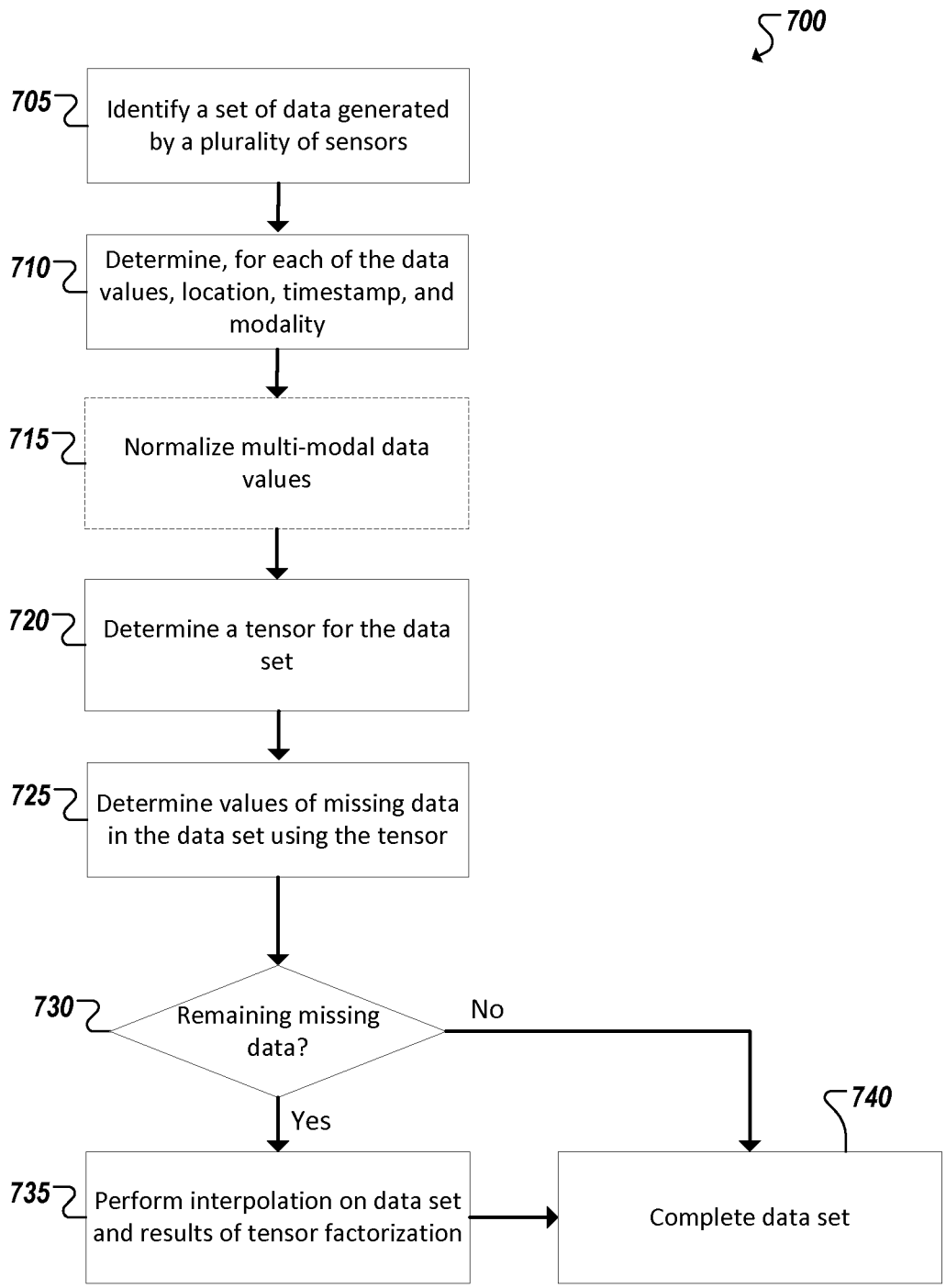
FIG. 7 is a flowchart illustrating an example technique for determining missing data using a tensor in accordance with at least some embodiments.

FIG. 7 is a simplified flowchart 700 illustrating an example technique for finding values of missing data. For instance, a set of sensor data can be identified 705 generated by a plurality of sensors located in different spatial locations within an environment. The plurality of sensors can include multiple different types of sensors and corresponding different types of sensor data can be included in the set of sensor data. A plurality of potential data points can exist, with some of the data points missing in the set of sensor data. For each data point (and corresponding sensor data value), a corresponding spatial location, timestamp, and modality can be determined 710. Location, timestamp, and modality can also be determined for data points with missing values. In some cases, spatial location, timestamp, and modality can be determined 710 from information included in the sensor data. For instance, sensor data can be reported by a sensor device together and include a sensor device or sensor identifier. From the sensor device identifier, attributes of the sensor data can be determined, such as the type of sensor(s) and location of the sensor device. Sensor data can also include a timestamp indicating when each data point was collected. The sensor data can be multi-modal and an optional data normalization process may be (optionally) performed 715 to normalize data values of different types within the data set. A three-dimensional tensor can be determined 720 from the data set, the dimensions corresponding to the data points' respective spatial locations, timestamps, and modalities. Values of the missing data in the set can be determined 725 or predicted from the tensor, for instance, using tensor factorization. For instance, latent factors can be determined from which missing data values can be inferred. The data set can then be updated to reflect the missing data values determined using the tensor together with the originally observed data point values. If missing data values remain (at 730) an interpolation step 735 can be performed on the updated data set to complete 740 the data set (and resolve any remaining missing data values). Any suitable interpolation technique can be applied. In other cases, all missing data values in the data set can be determined from the tensor and no missing data (at 730) may remain. Accordingly, in such cases, the data set can be completed 740 following completion of tensor factorization that determines values for all missing data values in a set.

Figure 8:
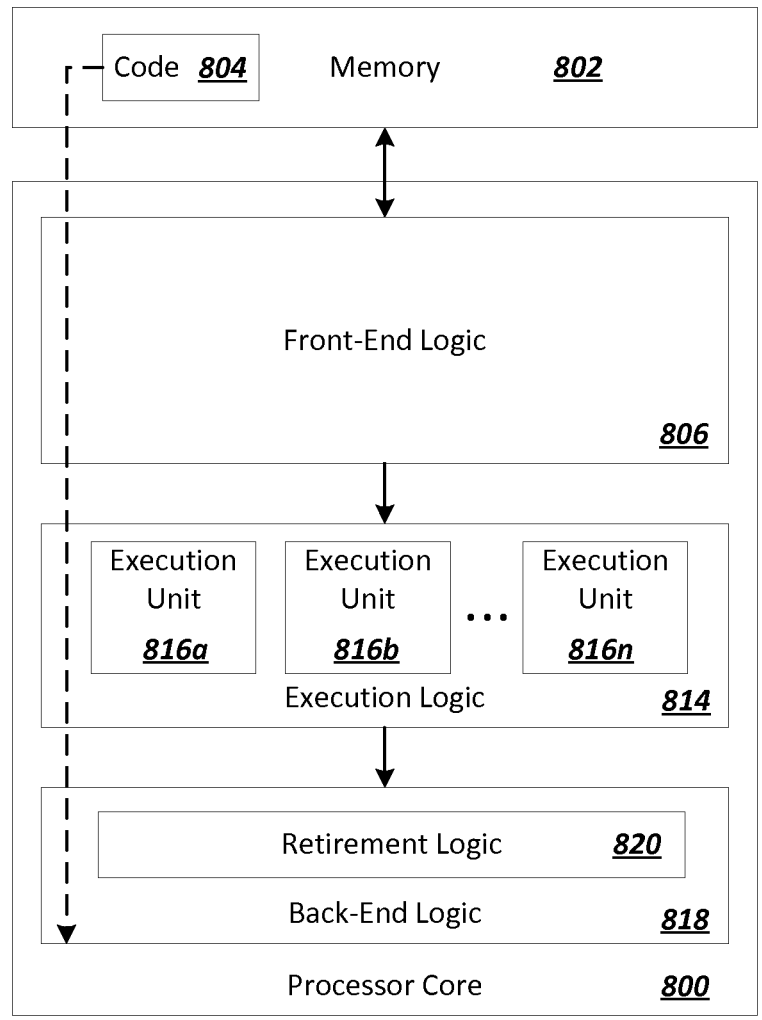
FIG. 8 is a block diagram of an exemplary processor in accordance with one embodiment.
Figure 9:
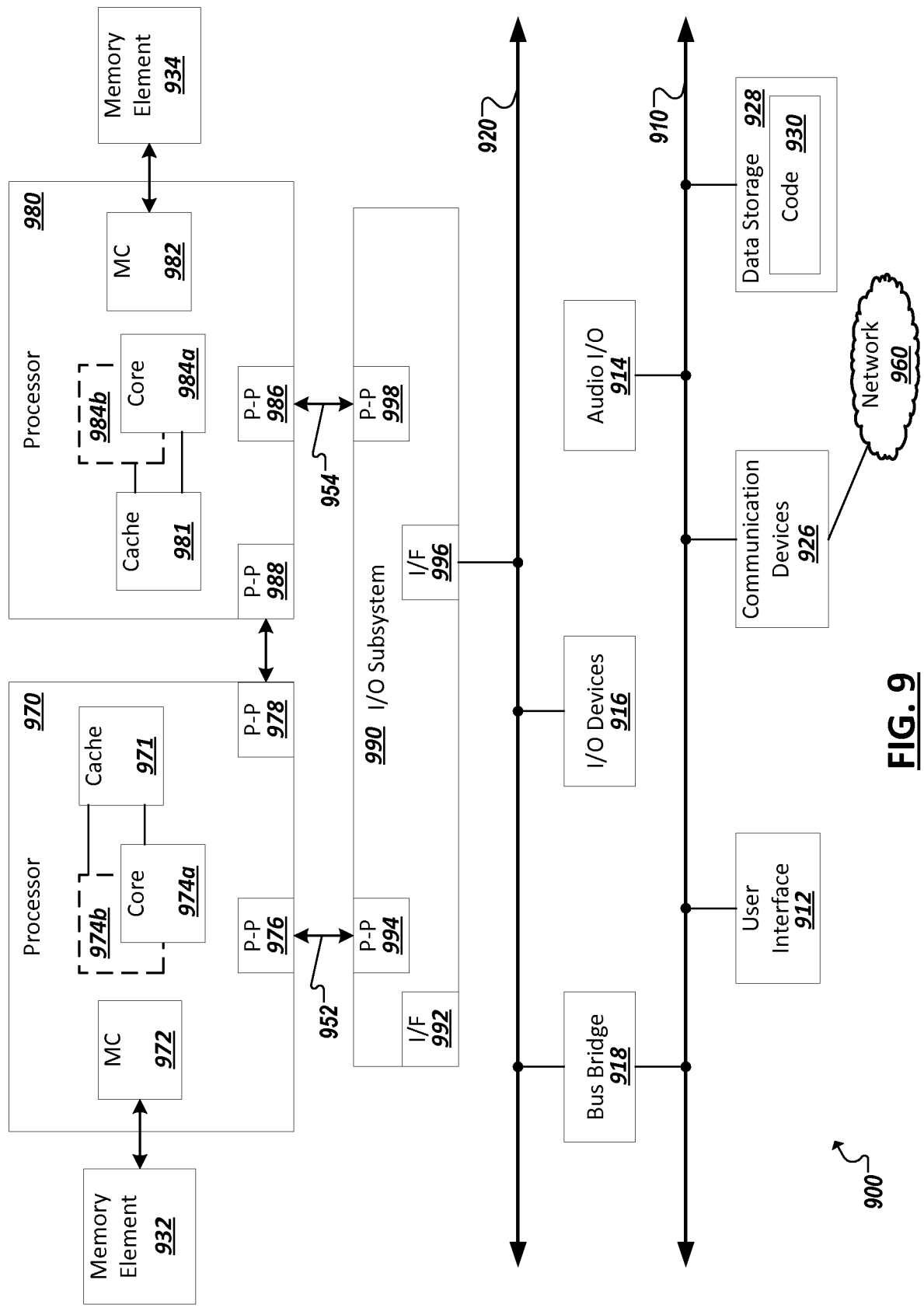
FIG. 9 is a block diagram of an exemplary computing system in accordance with one embodiment.

FIGS. 8-9 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 8-9.

FIG. 8 is an example illustration of a processor according to an embodiment. Processor 800 is an example of a type of hardware device that can be used in connection with the implementations above. Processor 800 may be any type of processor, such as a microprocessor, an embedded processor, a digital signal processor (DSP), a network processor, a multi-core processor, a single core processor, or other device to execute code. Although only one processor 800 is illustrated in FIG. 8, a processing element may alternatively include more than one of processor 800 illustrated in FIG. 8. Processor 800 may be a single-threaded core or, for at least one embodiment, the processor 800 may be multi-threaded in that it may include more than one hardware thread context (or "logical processor") per core.

FIG. 8 also illustrates a memory 802 coupled to processor 800 in accordance with an embodiment. Memory 802 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 800 can execute any type of instructions associated with algorithms, processes, or operations detailed herein. Generally, processor 800 can transform an element or an article (e.g., data) from one state or thing to another state or thing.

Code 804, which may be one or more instructions to be executed by processor 800, may be stored in memory 802, or may be stored in software, hardware, firmware, or any suitable combination thereof, or in any other internal or external component, device, element, or object where appropriate and based on particular needs. In one example, processor 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor 800 can also include execution logic 814 having a set of execution units 816a, 816b, 816n, etc. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor 800 allows out of order execution but requires in order retirement of instructions. Retirement logic 820 may take a variety of known forms (e.g., re-order buffers or the like). In this manner, processor 800 is transformed during execution of code 804, at least in terms of the output generated by the decoder, hardware registers and tables utilized by register renaming logic 810, and any registers (not shown) modified by execution logic 814.

Although not shown in FIG. 8, a processing element may include other elements on a chip with processor 800. For example, a processing element may include memory control logic along with processor 800. The processing element may include I/O control logic and/or may include I/O control logic integrated with memory control logic. The processing element may also include one or more caches. In some embodiments, non-volatile memory (such as flash memory or fuses) may also be included on the chip with processor 800.

FIG. 9 illustrates a computing system 900 that is arranged in a point-to-point (PtP) configuration according to an embodiment. In particular, FIG. 9 shows a system where processors, memory, and input/output devices are interconnected by a number of point-to-point interfaces. Generally, one or more of the computing systems described herein may be configured in the same or similar manner as computing system 900.

Processors 970 and 980 may also each include integrated memory controller logic (MC) 972 and 982 to communicate with memory elements 932 and 934. In alternative embodiments, memory controller logic 972 and 982 may be discrete logic separate from processors 970 and 980. Memory elements 932 and/or 934 may store various data to be used by processors 970 and 980 in achieving operations and functionality outlined herein.

Processors 970 and 980 may be any type of processor, such as those discussed in connection with other figures. Processors 970 and 980 may exchange data via a point-to-point (PtP) interface 950 using point-to-point interface circuits 978 and 988, respectively. Processors 970 and 980 may each exchange data with a chipset 990 via individual point-to-point interfaces 952 and 954 using point-to-point interface circuits 976, 986, 994, and 998. Chipset 990 may also exchange data with a high-performance graphics circuit 938 via a high-performance graphics interface 939, using an interface circuit 992, which could be a PtP interface circuit. In alternative embodiments, any or all of the PtP links illustrated in FIG. 9 could be implemented as a multi-drop bus rather than a PtP link.

Chipset 990 may be in communication with a bus 920 via an interface circuit 996. Bus 920 may have one or more devices that communicate over it, such as a bus bridge 918 and I/O devices 916. Via a bus 910, bus bridge 918 may be in communication with other devices such as a user interface 912 (such as a keyboard, mouse, touchscreen, or other input devices), communication devices 926 (such as modems, network interface devices, or other types of communication devices that may communicate through a computer network 960), audio I/O devices 914, and/or a data storage device 928. Data storage device 928 may store code 930, which may be executed by processors 970 and/or 980. In alternative embodiments, any portions of the bus architectures could be implemented with one or more PtP links.

The computer system depicted in FIG. 9 is a schematic illustration of an embodiment of a computing system that may be utilized to implement various embodiments discussed herein. It will be appreciated that various components of the system depicted in FIG. 9 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying the features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples. Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments may provide a method, an apparatus, a system, a machine readable storage, a machine readable medium, hardware- and/or software-based logic to identify a set of data including a plurality of observed values generated by a plurality of sensor devices located in a plurality of different locations, determine, for each of the plurality of observed values, a modality of the value, a spatial location of the value, and a timestamp of the value, and determine values for one or more missing values in the set of data from the modalities, spatial locations, and timestamps of the plurality of observed values.

In some examples, the plurality of sensor devices can include sensors of a plurality of different sensor types. The plurality of observed values can include values of a plurality of different value types, and each of the sensor types can correspond to at least a respective one of the value types. One or more tensors can be determined for the set of data based on the modalities, spatial locations, and timestamps of the plurality of observed values, and the values for the one or more missing values in the set of data can be determined using the tensor. The tensor incorporates spatial coherence among the plurality of observed values, temporal coherence among the plurality of observed values, and multi-modal coherence among the plurality of observed values. At least one of the spatial coherence, temporal coherence, and multi-model coherence can be non-continuous. The missing values can be determined using tensor factorization such as parallel factor (PARAFAC) decomposition. Determining the tensor can include normalizing the multi-modal values. The tensor can include a three-dimensional tensor.

In some examples, a subset of the missing values can be identified as falling outside the tensor and interpolation can be performed to derive the subset of missing values. The subset of missing values can correspond to a plane within the tensor in which no values exist. Interpolation can be performed in response to identifying existence of missing values falling outside the tensor. The interpolation can be performed using the one or more missing values determined from the tensor. The interpolation is performed using one or more of the plurality of observed values. Determining the one or more missing values includes learning latent values of the tensor. In some instances, the missing values can make up more than 50 percent of the values of the data set, even, in some cases more than 80 percent of the values of the data set. Modality can corresponds to a sensor type used to generate the value, spatial location can corresponds to physical location of the sensor used to generate the value, and the time stamp can indicates when the value was recorded.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. At least one non-transitory machine accessible storage medium having code stored thereon, the code when executed on a machine, causes the machine to:
identify a set of data comprising a plurality of observed values generated by a plurality of sensor devices, wherein the plurality of sensor devices are located in a plurality of different locations;
determine, for each of the plurality of observed values, a modality of the value, a spatial location of the value, and a timestamp of the value;
determine one or more tensors for the set of data based on the modalities, spatial locations, and timestamps of the plurality of observed values;
determine, from the one or more tensors, values for one or more missing values in the set of data from the modalities, spatial locations, and timestamps of the plurality of observed values;
identify a subset of the missing values falling outside the tensor; and
perform interpolation to derive the subset of missing values.

2. The storage medium of claim 1, wherein the plurality of sensor devices comprise sensors of a plurality of different sensor types.

3. The storage medium of claim 2, wherein the plurality of observed values comprise values of a plurality of different value types, and each of the sensor types corresponds to at least a respective one of the value types.

4. The storage medium of claim 1, wherein the tensor incorporates spatial coherence among the plurality of observed values, temporal coherence among the plurality of observed values, and multi-modal coherence among the plurality of observed values.

5. The storage medium of claim 4, wherein at least one of the spatial coherence, temporal coherence, and multi-modal coherence is non-continuous.

6. The storage medium of claim 1, wherein the missing values are determined using tensor factorization.

7. The storage medium of claim 6, wherein the tensor factorization comprises parallel factor (PARAFAC) decomposition.

8. The storage medium of claim 1, wherein determining the tensor comprises normalizing the multi-modal values.

9. The storage medium of claim 1, wherein the subset of missing values corresponds to a plane within the tensor in which no values exist.

10. The storage medium of claim 1, wherein interpolation is performed in response to identifying existence of missing values falling outside the tensor.

11. The storage medium of claim 1, wherein the interpolation is performed using the one or more missing values determined from the tensor.

12. The storage medium of claim 11, wherein the interpolation is performed using one or more of the plurality of observed values.

13. The storage medium of claim 1, wherein determining the one or more missing values comprise learning latent values of the tensor.

14. The storage medium of claim 1, wherein the missing values comprise more than 50 percent of the values of the data set.

15. The storage medium of claim 1, wherein modality corresponds to a sensor type used to generate the value, spatial location corresponds to physical location of the sensor used to generate the value, and the time stamp indicates when the value was recorded.

16. A method comprising:
identifying a set of data comprising a plurality of observed values generated by a plurality of sensor devices, wherein the plurality of sensor devices are located in a plurality of different locations;
determining, for each of the plurality of observed values, a modality of the value, a spatial location of the value, and a timestamp of the value;
determining one or more tensors for the set of data based on the modalities, spatial locations, and timestamps of the plurality of observed values;
determining, from the one or more tensors, values for one or more missing values in the set of data from the modalities, spatial locations, and timestamps of the plurality of observed values;
identifying a subset of the missing values falling outside the tensor; and
performing interpolation to derive the subset of missing values.

17. A system comprising:
one or more processors;
machine-readable memory;
a missing data generator, executable by the one or more processors to:
identify a set of data comprising a plurality of observed values generated by a plurality of sensor devices, wherein the plurality of sensor devices are located in a plurality of different locations;
determine, for each of the plurality of observed values, a modality of the value, a spatial location of the value, and a timestamp of the value;
determine one or more tensors for the set of data based on the respective modalities, spatial locations, and timestamps of the plurality of observed values;
determine, from the tensors, values for one or more missing values in the set of data;
identify a subset of the missing values falling outside the one or more tensors; and
perform interpolation to derive the subset of missing values.

* * * * *